(12) United States Patent
McFadden et al.

(10) Patent No.: US 6,380,324 B1
(45) Date of Patent: *Apr. 30, 2002

(54) REDUCTION OF POLYMER FOULING ON REACTOR SURFACE IN A CONTINUOUS PROCESS FOR PREPARING POLYMERS

(75) Inventors: Dawn Marie McFadden, Yardley; Richard Shu-Hua Wu, Ft. Washington, both of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/479,716

(22) Filed: Jan. 7, 2000

Related U.S. Application Data

(60) Provisional application No. 60/117,185, filed on Jan. 26, 1999.

(51) Int. Cl.[7] .............................. C08F 2/01; C08F 2/04; C08F 2/12

(52) U.S. Cl. ............................ 526/64; 526/88; 526/918

(58) Field of Search ............................ 526/64, 88, 918

(56) References Cited

U.S. PATENT DOCUMENTS

| | | | |
|---|---|---|---|
| 3,600,349 A | | 8/1971 | Stone |
| 3,730,928 A | | 5/1973 | Stone |
| 4,713,434 A | | 12/1987 | Sutterlin et al. |
| 4,925,896 A | | 5/1990 | Matarrese et al. |
| 5,268,437 A | * | 12/1993 | Holy et al. .................. 526/229 |
| 5,270,127 A | | 12/1993 | Koga et al. |

FOREIGN PATENT DOCUMENTS

| | | |
|---|---|---|
| EP | 0 150 225 | 7/1985 |
| EP | 0 486 262 A1 | 5/1992 |
| EP | 0 591 556 A1 | 4/1994 |
| EP | 0 834 518 A1 | 4/1998 |
| EP | 0 926 161 A1 | 6/1999 |
| JP | 2-4803 | 1/1990 |
| JP | 02 004803 A | 1/1990 |
| WO | WO95/01834 | 1/1995 |

* cited by examiner

*Primary Examiner*—David W. Wu
*Assistant Examiner*—Kelechi C. Egwim

(57) ABSTRACT

A continuous process for preparing polymers in a non-cylindrical heat exchanger is disclosed. The amount of monomer fed and polymer in the reactor is controlled to minimize fouling of the reactor. The use of steam to control the temperature of the reaction mixture is also disclosed.

20 Claims, No Drawings

REDUCTION OF POLYMER FOULING ON REACTOR SURFACE IN A CONTINUOUS PROCESS FOR PREPARING POLYMERS

This is a nonprovisional application of prior pending provisional application Ser. No. 60/117,185 filed Jan. 26, 1999.

This invention relates to a continuous process for preparing polymers, in particular to the reduction of polymer fouling on reactor surfaces in a continuous process for preparing polymers.

Polymers are typically commercially prepared in batch processes. Batch processes require several hours, in some cases greater than eight hours, to feed the reactants, including monomer or monomers into the reactor, conduct the polymerization reaction, cool the resulting polymer, remove the polymer, and clean the reactor. The equipment required for batch processes typically includes reactors which can hold up to 75,000 liters and may cost more than $1,000,000 per reactor.

To improve the deficiencies of the batch processes, continuous polymerization processes have been developed. Continuous polymerization processes are potentially more efficient than a batch process. In a continuous process, monomer and other reactants are continuously fed into and through the reactor while, at the same time, polymer is continuously removed from the reactor. A continuous process may produce more product per day, utilizing smaller, less expensive reactors. Continuous processes utilizing continuous stirred tank reactors or tubular reactors are two types of continuous processes. Both processes are susceptible to polymer fouling on the reactor surfaces. This polymer fouling results in having to shut the reactors down and clean the reactor surfaces. The cleaning process may be costly due to reduction of production time.

Co-pending U.S. patent application Ser. No. 60/068,177 discloses a continuous process for preparing polymers including continuously feeding a reaction mixture containing at least one monomer to at least one non- cylindrical channel, continuously controlling the temperature of the non-cylindrical channel by exposing the surface of the non-cylindrical channel not exposed to the reaction mixture containing at least one monomer to a temperature control medium, polymerizing the monomer in at least one non-cylindrical channel and continuously removing polymer from at least one non-cylindrical channel. The use of non-cylindrical channels reduces polymer fouling on the reactor surfaces, as compared with continuous stirred tank reactors or tubular reactors. Even though the use of non-cylindrical channels reduces polymer fouling, it does not eliminate polymer fouling.

Therefore, there is a need for an improved continuous process of preparing polymers whereby polymer fouling on the reactor surfaces is reduced.

We have discovered that controlling the ratio of the monomer fed to a reactor which contains polymer reduces the formation of polymer fouling on the reactor surfaces.

The present invention provides a continuous process for preparing polymers including: continuously feeding at least one reaction mixture containing at least one monomer to at least one non-cylindrical channel; continuously controlling the temperature of the non-cylindrical channel by exposing the surface of the non-cylindrical channel not exposed to the reactant to a temperature control medium; polymerizing the monomer in at least one non-cylindrical channel; and continuously removing the polymer from at least one non-cylindrical channel; wherein the rate at which the at least one reaction mixture containing at least one monomer is fed to at least one non-cylindrical channel containing polymer is controlled, such that the amount of monomer in the at least one non-cylindrical channel does not exceed the amount that can be swollen into the polymer in the at least one non-cylindrical channel.

By "non-cylindrical" it is meant any shape whereby the reactant is exposed to a greater surface area for a given length than a cylindrical shape. Suitable non-cylindrical shapes of the channel are for example, oval, ellipse, square, triangular, and flat.

The surface of the one or more non-cylindrical channels not exposed to the reaction mixture containing at least one monomer can be exposed to a temperature control medium. The temperature control medium may be a solid, gas or liquid. A typical gas medium may be applied by simply exposing the non-cylindrical channel to air. Liquid medium may be for example, water, brine, or glycol solvents such as ethylene glycol, diethylene glycol, propylene glycol, dipropylene glycol, and the like. Solid medium may be for example an electrically heated metal plate. It is preferable that the temperature control medium be a liquid.

The process may be operated at any temperature. The temperature typically ranges from 0 to 350° C., preferably 1 to 200° C., more preferably 3 to 100° C. The process may be operated under vacuum as low as 25 mm Hg, or at pressures up to 5,000 psi. The flow rate through the channel for the process may range from 50 ml/min to 750 L/min.

The non-cylindrical channels can be immersed in the temperature control medium by methods known in the art such as simply exposing to air, placing them in a forced air oven or placing them in a bath containing liquid or solid temperature control medium. However, it is preferable that the temperature control medium flows through separate, alternating channels to the non-cylindrical channels in which the reaction mixture containing at least one monomer flows. By alternating, it is meant that the channel next to a non-cylindrical channel in which the reaction mixture containing at least one monomer flows, contains temperature control medium. The non-cylindrical channels may share a common wall, or the non-cylindrical channels may have separate walls so long as the non-cylindrical channels are close enough together to provide sufficient temperature control to polymerize the monomer. It is further preferable that the flow of the temperature control medium be opposite to the flow of the reaction mixture containing at least one monomer to accomplish maximum heat transfer.

When at least two non-cylindrical channels are connected in a series or in parallel, and at least two reaction mixtures are fed to the separate non-cylindrical channels, it may be necessary to set the temperature of the first non-cylindrical channel at a different temperature than subsequent non-cylindrical channels. The temperature control media and methods described above may also be utilized in this case.

It may also be necessary to heat the reaction mixture containing at least one monomer prior to feeding the reaction mixture containing at least one monomer to the at least one non-cylindrical channel. The temperature control media described above may also be utilized to heat the reaction mixture containing at least one monomer. Generally, the reaction mixture containing at least one monomer would be stored in a heated vessel and fed to the at least one non-cylindrical channel. A problem associated with storing the reaction mixture containing at least one monomer in a heated vessel is that polymerization may begin to occur in the heated vessel rather than in the at least one non-cylindrical channel.

We have discovered that steam or inductive heating may be used to heat a reaction mixture containing at least one monomer being fed to one or more non-cylindrical channels. This is particularly useful in a multi-stage reactor, where a first reaction mixture containing at least one monomer is fed to a first non-cylindrical channel. The first reaction mixture exits the first non-cylindrical channel and enters a line which feeds the subsequent non-cylindrical channel. A subsequent reaction mixture containing at least one monomer may be fed into the line between the first non-cylindrical channel and the subsequent non-cylindrical channel. The subsequent reaction mixture is heated in the line between the first non-cylindrical channel and the subsequent non-cylindrical channel. This is known as interstage heating.

Many methods of imparting heat to a system rely on transferring the energy through the system wall, creating a situation where the system walls are at a higher temperature than the processing material. This may lead to fouling of the system. We have discovered that inter stage heating of the subsequent reaction mixture by steam or inductive heating avoids this problem.

With interstage heating, the steam may be fed to the subsequent reaction mixture containing at least one monomer by methods known in the art, such as injecting steam using a pipe in pipe heat exchanger. When steam is used to heat the reaction mixture containing at least one monomer, the amount of water in the initial reaction mixture containing at least one monomer (prior to feeding the reaction mixture containing at least one monomer to the non-cylindrical channel) may be reduced by the amount of water that will be brought into the reaction mixture containing at least one monomer by the steam.

One advantage to using steam to heat the reaction mixture containing at least one monomer is prevention of fouling which would occur if a "cold" reaction mixture containing at least one monomer were fed to a "hot" non-cylindrical channel. By "cold" is meant that the at least one reaction mixture containing at least one monomer is 4° C. or more lower than the temperature of the at least one non-cylindrical channel. By "hot" is meant that the at least one non-cylindrical channel is at or above the temperature at which polymerization occurs, for example 50° C. or greater.

Another advantage to utilizing steam to heat a reaction mixture being fed to at least one non-cylindrical channel just prior to entry into the at least one non-cylindrical channel is that the polymerization reaction will occur in the at least one non-cylindrical channel at the desired temperature. This leads to a more efficient process and a better quality product.

The width of the non-cylindrical channels and the contact of the reaction mixture containing at least one monomer with the surface of the non-cylindrical channels are such that efficient heat transfer takes place between the reaction mixture containing at least one monomer and the non-cylindrical channel's surface to cause the monomer to polymerize. Further, because the reaction mixture containing at least one monomer in the non-cylindrical channel is exposed to a greater surface area for any given length as compared to cylindrical reactors, the reaction mixture containing at least one monomer can have a shorter residence time in the non-cylindrical channel than in a cylindrical reactor, have efficient heat transfer take place and yield a comparable polymer product.

The non-cylindrical channels may be constructed of any material suitable for forming into the non-cylindrical shape and capable of providing sufficient heat transfer when exposed to a temperature control medium. Such materials are for example plastics such as polycarbonate and polypropylene, stainless-steel types 304 and 316; titanium, Monel, Incoloy 825, Hastelloy C, phosphor bronze, and cupronickel. In addition, the portion of the non-cylindrical channel exposed to the reaction mixture containing at least one monomer may be coated with materials such as graphite or polytetrafluoroethylene to aid in flow.

When more than one non-cylindrical channel is used, the non-cylindrical channels may be the same or different length and may be run in series or in parallel. Each non-cylindrical channel may also be run at different reaction conditions, such as at different temperature and pressure conditions.

At least one reaction mixture containing at least one monomer is fed to the non-cylindrical channels and flows through the non-cylindrical channels, preferably alternating with the temperature control medium. When the polymer is "grown out", the rate at which the reaction mixture is fed is critical. By "grown out" is meant that a polymer chain is formed in a first non-cylindrical channel, followed by growing or extending the polymer chain in at least one non-cylindrical channel. Therefore, during growing out of the polymer, there is polymer present in the at least one non-cylindrical channel.

If the reaction mixture containing at least one monomer feed rate in the at least one non-cylindrical channel is too fast, the amount of monomer in the at least one non-cylindrical channel will exceed the amount that can be "swollen into" the polymer in the at least one subsequent non-cylindrical channel. By "swollen into" is meant that the polymer can absorb a certain amount of monomer. As the polymer absorbs monomer, the polymer swells. The term swollen into therefore indicates the amount of monomer absorbed into the polymer.

While not wishing to be bound by theory, the inventors believe that when the amount of monomer in the at least one subsequent non-cylindrical channel exceeds the amount that can be swollen into the polymer in the at least one non-cylindrical channel, the reactor surfaces tend to foul with polymer due to the excess monomer polymerizing on the surface of the at least one non-cylindrical channel.

Therefore, the key to this invention is controlling the rate at which the at least one reaction mixture containing at least one monomer is fed to the at least one non-cylindrical channel containing polymer, such that the amount of monomer in the at least one non-cylindrical channel containing polymer does not exceed the amount that can be swollen into the polymer in the at least one non-cylindrical channel. Preferably, the amount of monomer in the at least one non-cylindrical channel containing polymer does not exceed 75% of the amount that can be swollen into the polymer in the at least one non-cylindrical channel. More preferably, the amount of monomer in the at least one non-cylindrical channel containing polymer does not exceed 50% of the amount that can be swollen into the polymer in the at least one non-cylindrical channel.

The amount of monomer that can be swollen into a homopolymer made from the monomer is known to those skilled in the art. For example, swell values for several monomers are reported in a paper titled "Heterophase Polymerization" by N. Frius and A.E. Hamielec (copyright 1975). Some of the monomers and swelling ratios reported (mass monomer:mass polymer) are as follows:

| Monomer | Swelling Ratio |
|---|---|
| butadiene | 2:3 |
| isobutyl methacrylate | 1:1 |
| n-butyl methacrylate | 3:2 |
| n-butyl acrylate | 2:1 |
| ethyl acrylate | 3:1 |
| methyl methacrylate | 3:2 |
| styrene | 2:1 |
| vinylidene chloride | 1:4 |
| vinyl chloride | 1:4 |
| vinyl acetate | 3:1 |
| butyl acrylate/methyl methacrylate | 3:2 (measured) |

The swelling ratio may also be measured by weighing a polymer, adding monomer to the polymer until the polymer is saturated, and weighing the saturated polymer. The swelling ratio is the saturated weight minus the initial weight compared to the initial weight.

In order to prevent the amount of monomer in the at least one non-cylindrical channel from exceeding the amount that can be swollen into the polymer in the at least one non-cylindrical channel, the feed rate of the reaction mixture containing at least one monomer may be controlled by methods known in the art. Suitable methods include the use of flow meters and the measurement of weight loss from a feed tank over time.

The reaction mixture containing at least one monomer flows through the non-cylindrical channels at a rate sufficient to polymerize the monomer. In instances where a polymer product with a low polydispersity index is desired, the residence time of the reaction mixture containing at least one monomer is sufficient to yield a polydispersity index of less than 2.0. The residence time is typically less than 30 minutes, preferably less than 20 minutes. The flow rate may be adjusted based on the desired residence time in the non-cylindrical channels and the total surface area of the non-cylindrical channels. In general, the higher the total surface area of the non-cylindrical channels, the faster the flow rate may be. The polymer is continuously removed through an outlet of the non-cylindrical channels.

The non-cylindrical channel can have one or more inlets. The reaction mixture containing at least one monomer may be fed into an inlet to the non-cylindrical channel which has a different inlet within the non-cylindrical channel, allowing a different reaction mixture containing at least one monomer to be fed at a different point in the process. Where more than one non-cylindrical channel is used, the reaction mixture containing at least one monomer may be fed through a series of non-cylindrical channels, for example the reaction mixture containing at least one monomer may be fed through one non-cylindrical channel into a connected non-cylindrical channel. There may be inlets between the connected non-cylindrical channels to allow a different reaction mixture containing at least one monomer to be fed at a different point in the process to a separate non-cylindrical channel. The different non-cylindrical channels may be run at different temperature and pressure conditions. The reaction mixture containing at least one monomer may also be fed into inlets in parallel non-cylindrical channels, whereby the reaction mixture containing at least one monomer flows through multiple non-cylindrical channels at the same time. The parallel non-cylindrical channels may have different inlets within the non-cylindrical channels, allowing a different reaction mixture containing at least one monomer to be fed at a different point in the process to separate non-cylindrical channels. The non-cylindrical channels may be run at different temperature and pressure conditions. The non-cylindrical channels may have one or more outlets. The polymer may be removed from the outlet of the non-cylindrical channel, or the polymer may be fed from the outlet of one non-cylindrical channel into one or more inlets of separate non-cylindrical channels.

The process may be used to prepare any type of polymerization, for example emulsion polymerizations, solution polymerizations, or suspension polymerizations. The polymerizations may occur through addition or condensation reactions. Addition reactions include free radical, anionic, and cationic polymerizations. Emulsion polymerizations prepared by the process of this invention can be single stage or multi-stage. For multi-stage emulsion polymers, a first monomer emulsion may be polymerized in a non-cylindrical channel and a second monomer emulsion may be fed either into a port in the non-cylindrical channel, or into a port before or in a second connected non-cylindrical channel. The first stage may also be pre-polymerized so that both the first stage and the second monomer emulsion are fed to a single non-cylindrical channel. More flexibility in the process may be achieved by connecting a third, fourth, or fifth non-cylindrical channel either in a series or in parallel to the process.

The non-cylindrical channel and alternating channels for the temperature control medium can be for example, certain types of heat exchangers such as plate-frame, plate-fin, and spiral-plate heat exchangers. Some of these heat exchangers are commercially available. The plate-frame heat exchanger consists of standard plates which may be flat or corrugated. Corrugated plates are preferred due to improved mixing of the monomer with the other reactants. The plates serve as heat exchange surfaces and may be made of stainless-steel types 304 and 316; titanium, Monel, Incoloy 825, Hastelloy C, phosphor bronze, and cupronickel. The plates may be coated with materials such as graphite or polytetrafluoroethylene. The plates form alternating non-cylindrical channels for the reaction mixture containing at least one monomer and the temperature control medium to flow through. The plates are supported by a frame. Gaskets prevent leakage where the plate and frame meet. The frame may be made of clad stainless steel and enamel-coated mild steel.

The plate-fin heat exchanger is similar to the plate-frame heat exchanger, but has a stack of layers, each consisting of a corrugated fin between flat metal sheets. The sheets are sealed off on two sides by channels or bars to form passages for the flow of the reaction mixture containing at least one monomer and the temperature control medium. The temperature control medium may flow counter-current to or cocurrent with the reaction mixture containing at least one monomer.

The spiral-plate heat exchanger is made from a pair of plates rolled to provide long rectangular passages for the temperature control medium and the reaction mixture containing at least one monomer in counter-current or cocurrent flow.

The reaction mixture containing at least one monomer may be a mixture of at least one monomer and at least one initiator and solvent. Suitable solvents include, but are not limited to acetone, water, ethanol, methanol, butanol, isopropanol, propylene glycol monobutyl ether, ethylene glycol monobutyl ether, methylethyl ketone, dimethylformamide, and dimethylsulfoxide. Where emulsion polymerization is desired, surfactant may be combined with the monomer, the initiator, and water. By surfactant is meant a compound which reduces surface tension when dissolved in water or water solutions, or which reduces interfacial tension between two liquids, or between a liquid and a solid. Included in surfactants are detergents, wetting agents, and emulsifiers. Suitable surfactants include, but are not limited to anionic and nonionic emulsifiers such as alkali and ammonium alkyl sulfates, for example sodium lauryl sulfate, alkyl sulfonic acids, fatty acids, and oxyethylated alkyl phenols. The amount of surfactant used is typically 1 to 6% by weight, based on the weight of total monomer. The amount of water used is typically from 5 to 90% by weight, based on the weight of total monomer. The surfactant and water may also may be used in downstream dilutions of polymer emulsions made from the monomer emulsions. Suitable monomers include ethylenically unsaturated monomers such as, for example, acrylic esters such as methyl (meth)acrylate, ethyl acrylate, butyl (meth)acrylate, 2-ethylhexyl acrylate, decyl (meth)acrylate, hydroxyethyl (meth)acrylate, and hydroxypropyl (meth)acrylate; acrylamide or substituted acrylamides; styrene or substituted styrenes; ethylene, propylene, butadiene; vinyl acetate or other vinyl esters; vinyl monomers such as vinyl chloride, vinylidene chloride, N-vinyl pyrolidone; and acrylonitrile or methacrylonitrile. Copolymerizable ethylenically unsaturated acid monomers such as, for example, (meth)acrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, maleic anhydride and salts thereof may also be used. Preferred monomers are butyl acrylate, ethyl acrylate, 2-ethyl hexylacrylate, methyl methacrylate, styrene, and vinyl acetate. More preferred monomers are butyl acrylate, methyl methacrylate, and vinyl acetate. By (meth)acrylate is meant both acrylate and methacrylate monomers.

Electrolytes such as sodium hydroxide, sodium phosphate, disodium phosphate, sodium carbonate, and ammonia may be added to the reaction mixture containing at least one monomer. The electrolyte may be added at from 0.1 to 15 percent based on the total weight of the monomers in the reaction mixture.

A chelating agent such as ethylenediamine tetraacetic acid may also be added to the reaction mixture containing at least one monomer. The chelating agent may be added at from 0.01 to 2 percent based on the total weight of the monomers in the reaction mixture.

The method of initiation is not critical to the process of the invention. Preferably, initiation is effected through the use of thermal or redox initiation. Conventional free radical initiators such as, for example, peroxygen compounds including inorganic persulfate compounds such as ammonium persulfate, potassium persulfate, and sodium persulfate; peroxides such as hydrogen peroxide; organic hydroperoxides such as cumene hydroperoxide and t-butyl hydroperoxide; organic peroxides such as benzoyl peroxide, acetyl peroxide, lauroyl peroxide, peracetic acid, and perbenzoic acid (sometimes activated by a water-soluble reducing agent such as a ferrous compound or sodium bisulfite); as well as other free-radical producing materials such as 2,2'-azobisisobutyronitrile may be used, typically at a level of 0.05% to 3% by weight, based on the weight of total monomer. Redox systems using the same initiators coupled with a suitable reductant (activator) such as, for example, isoascorbic acid, sodium sulfoxylate formaldehyde, and sodium bisulfite may be used at similar levels. Ferrous sulfate and other metal ions can be used as promoters at similar levels. Other suitable methods of initiation such as the use of irradiation with Ultra Violet light, electron beam irradiation, gamma irradiation, Ultrasonic, or mechanical means to induce free-radical generation are deemed to be within the scope of this invention.

For an emulsion polymerization, the monomer emulsion must not phase separate or otherwise become unstable in a manner that interferes with the efficiency of the polymerization reaction. In cases where the monomer emulsion has the tendency to become unstable before polymerization, it can be premixed and thus stabilized before being fed to the non-cylindrical channel. A mixer such as a static mixer or pre-mixer may be used in the process for this purpose.

The following examples illustrate a continuous polymerization process. Abbreviations used throughout are:

%=percent DI=deionized mm=millimeters ml=milliliters min=minutes ml/min=milliliters per minute L=liters For all Examples, monomer emulsions were prepared by admixing butyl acrylate, methyl methacrylate, methacrylic acid, an anionic surfactant, an electrolyte, a chelating agent, and water in a line. The premixer was set at a speed such that an emulsion was formed. All percents are by weight.

EXAMPLE #1

A monomer mixture (46% butyl acrylate, 53% methyl methacrylate, 1% methacrylic acid) was fed at 53.9 g/min from a 7.6 L tank to a pre-mixer. An aqueous mixture (1.4% anionic surfactant) was fed at 9.7 g/min from a 7.6 L tank to a pre-mixer. The pre-mixer was set to a speed such that a stable monomer emulsion was produced. The emulsion was diluted further by a 12.5 g/min aqueous stream. A 20 l aqueous feed tank was used to feed hot DI water to the front of the process. A 3% ammonium persulfate catalyst solution was prepared. The solution was mixed well and fed to the catalyst feed tank. A 1.1% sodium sulfoxylate formaldehyde/ 0.01% g ferrous sulfate heptahydrate activator solution was prepared. The solution was mixed well and fed to the activator feed tank.

DI water was heated to 95° C. A three reactor (three consecutive Tranter UFX-6 plate-frame heat exchangers) system was utilized. The water was pumped through the process lines in order to heat the system. The temperature for the "water-side" of the reactors was then set. For reactor A the water was set to 70° C. For reactor B the water was set to 78° C. For reactor C the water was set to 83° C. Tempered water flow through the "water-side" was begun. The reactor temperature was allowed to equilibrate.

The DI water flow was adjusted to 57.5 g/min. The catalyst pump was turned on to 15.56 ml/min. The activator pump was turned on to 4.76 ml/min. The monomer emulsion feed was introduced before reactor A at a rate of 22.1 g/min. The temperature of the water in the heating bath that fed a pipe in pipe heat exchanger on the aqueous feed line was adjusted to insure that the temperature of the emulsion at the heat exchanger inlet was approximately 73° C. After the effluent from reactor A reached steady state, the monomer emulsion feed was introduced before reactor B at a rate of 18.5 g/min. The emulsion at the heat exchanger inlet was approximately 670 C. After the effluent from reactor B reached steady state, the monomer emulsion feed was introduced before reactor C at a rate of 30.4 g/min. Hot DI water was introduced before reactor C at a rate of approximately 4 g/min. The temperature of the stream entering reactor C was approximately 730 C. The monomer emulsion was fed continuously to the heat exchangers. The monomer was polymerized in the heat exchangers. Polymer was continuously removed from the heat exchangers and collected and cooled in the final product holding tank. Samples were added to vials which contained a pre-weighed amount of 4-hydroxy-2, 2, 6, 6-tetramethyl piperidinyloxy, free radical. When the volume was low in any of the feed tanks it was replenished with a charge equivalent to the original. After 3 hours of running, warm soapy water was pumped through the system in order to flush out any remaining emulsion. This was continued until the exiting liquid was clear.
Results A stable latex with a 31% solids content and a mean weight average particle diameter of 105 nm was obtained as a product out of reactor C. The polydispersity of the product was 1.16. Reaction at the end of reactor C for the product totaled 92% . Steady pressure increases in the system began concurrently with the start of feeds to reactor C. At approximately 40 minutes into the feed to reactor C the monomer emulsion feed rate began to drop off, due to the high pressures in the system (>35 psig).

Salt tracer studies were used to determine residence time in the reactor. For the salt tracer studies, water was pumped through the reactors. At time 0, a 5% solution of aqueous sodium chloride was injected into the heat exchanger. The effluent from the heat exchanger was monitored by a conductivity detector. The difference between time 0 and the time at which the sodium chloride solution was detected indicated the residence time of the solution in the heat exchangers. The average residence time for reactors A and B was 8 minutes (at 115 ml/min of water) and 27.5 minutes for reactor C (at 200 ml/min of water) before running the experiment. After the experiment the salt tracer could not be run due to high levels of fouling in the system. The system was dismantled and the fouled plates were replaced. The most fouling was observed in the middle channel of reactor B and the front half ($1^{st}$ 5 channels) of reactor C.

EXAMPLE #2

A monomer mixture (46% butyl acrylate, 53% methyl methacrylate, 1% methacrylic acid) was fed at 53.9 g/min from a 7.6 L tank to a pre-mixer. An aqueous mixture (1.4% anionic surfactant) was fed at 9.7 g/min from a 7.6 L tank to a pre-mixer. The pre-mixer was set to a speed such that a stable monomer emulsion was produced. The emulsion was diluted further by a 12.5 g/min aqueous stream, resulting in a 71% monomer emulsion. A 20 1 aqueous feed tank was used to feed hot DI water to the front of the process. A 3% ammonium persulfate catalyst solution was prepared. The solution was mixed well and fed to the catalyst feed tank. A 1.1% sodium sulfoxylate formaldehyde/0.01% g ferrous sulfate heptahydrate activator solution was prepared. The solution was mixed well and fed to the activator feed tank.

DI water was heated to 95° C. The water was pumped through the process lines in order to heat the system. The temperature for the "water-side" of the reactors was then set. For reactor A the water was set to 70° C. For reactor B the water was set to 70° C. For reactor C the water was set to 83° C. Tempered water flow through the "water-side" was begun. The reactor temperature was allowed to equilibrate.

The DI water flow was adjusted to 57.5 g/min. The catalyst pump was turned on to 15.56 ml/min. The activator pump was turned on to 4.76 ml/min. The monomer emulsion feed was introduced before reactor A at a rate of 22.1 g/min. The temperature of the water in the heating bath that fed a pipe in pipe heat exchanger on the aqueous feed line was adjusted to insure that the temperature of the emulsion at the heat exchanger inlet was approximately 73° C. After the effluent from reactor A reached steady state, the monomer emulsion feed was introduced before reactor B at a rate of 18.5 g/min. The emulsion at the heat exchanger inlet was approximately 67° C. After the effluent from reactor B reached steady state, the monomer emulsion feed was introduced before reactor C at a rate of 30.4 g/min. Steam was introduced before reactor C at a rate of approximately 4 g/min. The temperature of the stream entering reactor C was approximately 84° C. The monomer emulsion was fed continuously to the heat exchangers. The monomer was polymerized in the heat exchangers. Polymer was continuously removed from the heat exchangers and collected and cooled in the final product holding tank. Samples were added to vials which contained a pre-weighed amount of 4-hydroxy-2, 2, 6, 6-tetramethyl piperidinyloxy, free radical. When the volume was low in any of the feed tanks it was replenished with a charge equivalent to the original. After 3¾ hours of running, warm soapy water was pumped through the system in order to flush out any remaining emulsion. This was continued until the exiting liquid was clear.
Results A stable latex with a 31% solids content and a mean weight average particle diameter of 103 nm was obtained as a product out of reactor C. The polydispersity of the product was 1.14. Reaction at the end of reactor C for the product totaled 94%.

Salt tracer studies were used to determine residence time in the reactor. For the salt tracer studies, water was pumped through reactors. At time 0, a 5% solution of aqueous sodium chloride was injected into the heat exchanger. The effluent from the heat exchanger was monitored by a conductivity detector. The difference between time 0 and the time at which the sodium chloride solution was detected indicated the residence time of the solution in the heat exchangers. The average residence time for reactors A and B was 8 minutes (at 115 ml/min of water) and 27.5 minutes for reactor C (at 200 ml/min of water) before and after running the experiment. Therefore the system did not need to be dismantled.

EXAMPLE #3

The above experiment was replicated except for the following changes. A monomer mixture (46% butyl acrylate, 53% methyl methacrylate, 1% methacrylic acid) was fed at 58.0 g/min from a 7.6 L tank to a pre-mixer. An aqueous mixture (2.9% anionic surfactant) was fed at 10.4 g/min from a 7.6 L tank to a pre-mixer. The pre-mixer was set to a speed such that a stable monomer emulsion was produced. The emulsion was diluted further by a 7.9 g/min aqueous stream, resulting in a 76% monomer emulsion.

The monomer emulsion feed was introduced before reactor A at a rate of 20.6 g/min. After the effluent from reactor A reached steady state, the monomer emulsion feed was introduced before reactor B at a rate of 17.3 g/min. After the effluent from reactor B reached steady state, the monomer emulsion feed was introduced before reactor C at a rate of 28.4 g/min. After 4¾ hours of running, warm soapy water was pumped through the system in order to flush out any remaining emulsion.
Results A stable latex with a 31% solids content and a mean weight average particle diameter of 101 nm was obtained as a product out of reactor C. The polydispersity of the product was 1.14. Reaction at the end of reactor C for the product totaled 94% .

Due to the higher percentage monomer in the monomer emulsion there was a significant increase in viscosity of the monomer emulsion in this run compared to Example 2.

There was much difficulty controlling the monomer emulsion feeds at setpoint during this run. The monomer emulsion feed to reactor C was observed as high as 40 g/min (131% of setpoint) at the same time reactor A was feeding 17.5 g/min (85% of setpoint) and the monomer emulsion feed to reactor B was 14.2 g/min (82% of set point). This imbalance in feed rates would lead to more monomer in the system than polymer to absorb it. Pressure in the units began to increase during this run. The final system pressure was 10 psi higher than the initial pressure. Salt tracer could not be completed after the run due to the pressure. The system was dismantled and the fouled plates cleaned and/or replaced.

What is claimed:

1. A continuous process for preparing polymers comprising:
   continuously feeding at least one reaction mixture containing at least one monomer to at least one non-cylindrical channel;
   continuously controlling the temperature of the at least one non-cylindrical channel by exposing the surface of the at least one non-cylindrical channel not exposed to the at least one monomer to a temperature control medium;
   polymerizing the at least one monomer in the at least one non-cylindrical channel by emulsion polymerization or suspension polymerization; and
   continuously removing the polymer from the at least one non-cylindrical channel;
   wherein the rate at which the at least one reaction mixture containing the at least one monomer is fed to the at least one non-cylindrical channel containing the polymer is controlled, such that the amount of the at least one monomer in the at least one non-cylindrical channel does not exceed the amount that can be swollen into the polymer in the at least one non-cylindrical channel.

2. The process according to claim 1 wherein the amount of the at least one monomer in the at least one non-cylindrical channel does not exceed 75% of the amount that can be swollen into the polymer in the at least one non-cylindrical channel.

3. The process according to claim 1 wherein the amount of at least one monomer in the at least one non-cylindrical channel does not exceed 50% of the amount that can be swollen into the polymer in the at least one non-cylindrical channel.

4. The process according to claim 1 wherein the at least one non-cylindrical channel is a plate-frame, plate-fin, or spiral-plate heat exchanger.

5. The process according to claim 4 wherein the at least one non-cylindrical channel is a plate-frame heat exchanger.

6. The process according to claim 1 wherein the reaction mixture containing at least one monomer comprises an emulsion prepared by combining at least one monomer, at least one initiator, at least one surfactant, and solvent.

7. The process according to claim 6 wherein the solvent is selected from the group consisting of acetone, water, ethanol, methanol, butanol, isopropanol, propylene glycol monobutyl ether, ethylene glycol monobutyl ether, methylethyl ketone, dimethylformamide, and dimethylsulfoxide.

8. A continuous process for preparing polymers comprising the steps of:
   continuously feeding a first reaction mixture comprising at least one monomer to a first non-cylindrical channel;
   polymerizing the at least one monomer in the first non-cylindrical channel by emulsion polymerization or suspension polymerization;
   continuously removing the polymer from the first non-cylindrical channel;
   continuously feeding the polymer and a subsequent reaction mixture comprising a second at least one monomer into a line;
   continuously heating the subsequent reaction mixture in the line;
   continuously removing the polymer and the subsequent reaction mixture from the line;
   continuously feeding the polymer and the subsequent reaction mixture to a subsequent non-cylindrical channel;
   polymerizing the second at least one monomer in the subsequent non-cylindrical channel;
   continuously removing the polymer from the subsequent non-cylindrical channel;
   wherein the temperature of the first non-cylindrical channel and the temperature of the subsequent non-cylindrical channel are controlled by exposing the surface of the first non-cylindrical channel not exposed to the at least one monomer and exposing the surface of the subsequent non-cylindrical channel not exposed to the second at least one monomer to temperature control medium;
   wherein the rate at which the first reaction mature is fed to the first non-cylindrical channel containing polymer is controlled, such that the amount of: the at least one monomer in the first non-cylindrical channel does not exceed the amount that can be swollen into the polymer in the first non-cylindrical channel.

9. The process according to claim 8 wherein the amount of the at least one monomer in the first non-cylindrical channel does not exceed 75% of the amount that can be swollen into the polymer in the first non-cylindrical channel.

10. The process according to claim 8 wherein the amount of at least one monomer in the first non-cylindrical channel does not exceed 50% of the amount that can be swollen into the polymer in the first non-cylindrical channel.

11. The process according to claim 8 wherein the rate at which the subsequent reaction mixture is fed to the subsequent non-cylindrical channel containing polymer is controlled, such that the amount of the second at least one monomer in the subsequent non-cylindrical channel does not exceed the amount that can be swollen into the polymer in the subsequent non-cylindrical channel.

12. The process according to claim 11 wherein the amount of the at least one monomer in the subsequent non-cylindrical channel does not exceed 75% of the amount that can be swollen into the polymer in the subsequent non-cylindrical channel.

13. The process according to claim 11 wherein the amount of at least one monomer in the subsequent non-cylindrical channel does not exceed 50% of the amount that can be swollen into the polymer in the subsequent non-cylindrical channel.

14. The process according to claim 8 wherein continuously heating the subsequent reaction mixture in the line is accomplished by a method selected from the group consisting of inductive heating and steam feeding.

15. The process according to claim 8 wherein the first non-cylindrical channel is a plate-frame, plate-fin, or spiral-plate heat exchanger.

16. The process according to claim 8 wherein the subsequent non-cylindrical channel is a plate-frame, plate-fin, or spiral-plate heat exchanger.

17. The process according to claim 8 wherein the first reaction mixture containing at least one monomer comprises an emulsion prepared by combining at least one monomer, at least one initiator, at least one surfactant, and solvent.

18. The process according to claim 17 wherein the solvent is selected from the group consisting of acetone, water, ethanol, methanol, butanol, isopropanol, propylene glycol monobutyl ether, ethylene glycol monobutyl ether, methylethyl ketone, dimethylformamide, and dimethylsulfoxide.

19. The process according to claim 8 wherein the subsequent reaction mixture containing second at least one monomer comprises an emulsion prepared by combining at least one monomer, at least one initiator, at least one surfactant, and solvent.

20. The process according to claim 19 wherein the solvent is selected from the group consisting of acetone, water, ethanol, methanol, butanol, isopropanol, propylene glycol monobutyl ether, ethylene glycol monobutyl ether, methylethyl ketone, dimethylformamide, and dimethylsulfoxide.

* * * * *